United States Patent [19]

Mauron

[11] 4,155,591

[45] May 22, 1979

[54] SAFETY SEAT FOR A CHILD

[75] Inventor: Gerard Mauron, Versailles, France

[73] Assignees: Automobiles Peugeot; Regis Nationale des Usines Renault, both of France

[21] Appl. No.: 863,250

[22] Filed: Dec. 22, 1977

[30] Foreign Application Priority Data

Jan. 21, 1977 [FR] France ................................ 77 01804

[51] Int. Cl.² ...................... B60R 21/10; A62B 35/00
[52] U.S. Cl. .................................... 297/216; 297/250; 297/386; 297/390
[58] Field of Search ............... 297/216, 390, 286, 250, 297/253, 254

[56] References Cited

U.S. PATENT DOCUMENTS

| | | | |
|---|---|---|---|
| 3,788,699 | 1/1974 | Starr | 297/390 |
| 3,945,678 | 3/1976 | Neuman | 297/390 |
| 3,948,556 | 4/1976 | Hyde et al. | 297/390 |
| 3,957,303 | 5/1976 | Mauron | 297/216 |
| 3,957,303 | 5/1976 | Mauron | 297/390 |
| 3,964,787 | 6/1976 | Labide et al. | 297/216 X |

Primary Examiner—James T. McCall
Attorney, Agent, or Firm—Burns, Doane, Swecker & Mathis

[57] ABSTRACT

The safety seat comprises two parts and side walls. One seat part defines a seating, at least a rear part of the side walls and an arrangement for fixing the safety seat to a vehicle seat. The other seat part comprises a band and at least a front part of the side walls. A joint line of separation between the two seat parts has the shape of an L in the substantially vertical branch of which the energy absorbing and locking devices are located on each side of the safety seat whereas the substantially horizontal branch of the L constitutes an arrangement for guiding the two seat parts relative to each other.

5 Claims, 3 Drawing Figures

U.S. Patent
May 22, 1979
4,155,591
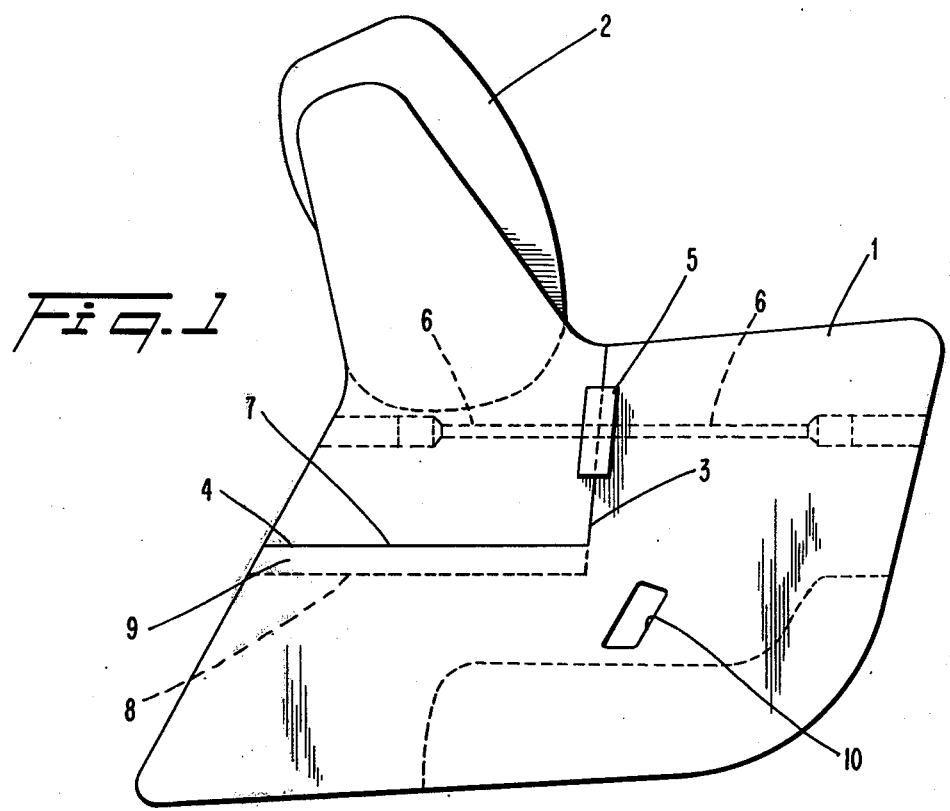
Fig.1
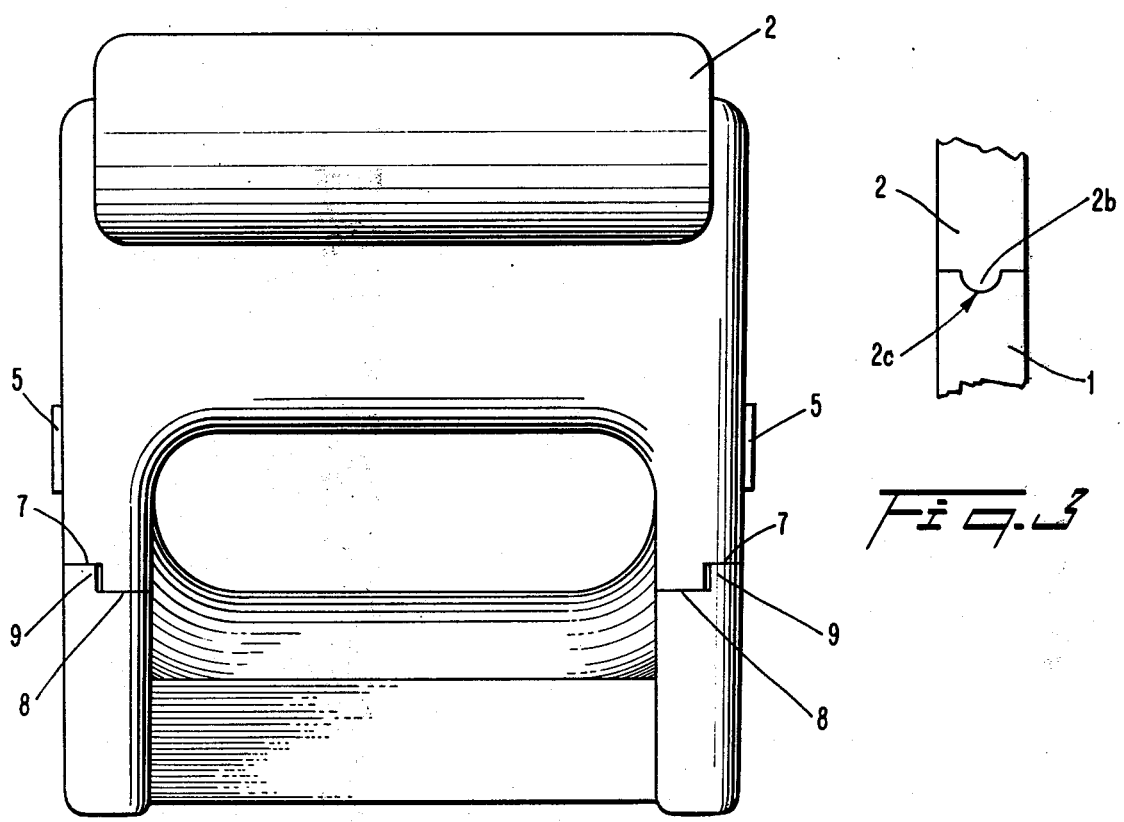
Fig.2
Fig.3

SAFETY SEAT FOR A CHILD

The present invention relates to a safety device which is adaptable to a normal vehicle seat and intended for young children.

This device comprises a seat arranged in two parts, the first part of which defines a seating, means for fixing to a vehicle seat and at least the rear part of side walls, whereas the second part comprises a band and at least a front part of the side walls, energy absorbing means being disposed on each side of the safety seat between the two parts of the side walls. If as a result of a shock the child is projected forwardly, he is retained by the band which tends to move away from the rear part of the seat and actuates the energy absorbing means which ensures a progressive braking of the child.

According to a first embodiment of U.S. Pat. No. 3,957,303, the safety seat comprises, on each side, two energy absorbing means, two means for hooking the front part of the seat to the rear part of the seat, which presents a certain difficulty for positioning.

According to another embodiment described in the Certificate of Addition No. 76 17 978 to French Pat. No. 74 12, 146, the seat is associated with a support bearing on the floor, which permits retaining on each side only a single energy absorbing means and a single hooking means while retaining a good guiding which prevents the front part of the seat from swinging downwardly.

An object of the present invention is to simplify the fixing means and energy absorbing means provided in the first embodiment mentioned hereinbefore without requiring a separate support bearing on the floor and retaining a good guiding preventing the front part of the seat from swinging downwardly when the safety seat operates.

For this purpose, the safety seat defined hereinbefore is so arranged that the line of separation between two parts of the seat in the region of the side walls has an L-shape having a substantially vertical branch which comprises the locking means connected to the energy absorbing means and a substantially horizontal branch which constitutes guide means between the two parts.

According to another feature, along the substantially horizontal branch of the joint between the two parts of the seat, the confronting faces of these two parts have a complementary shape adapted to ensure a positioning and lateral guiding between the two parts.

An embodiment of the invention will be described in the ensuing description with reference to the accompanying drawing, in which:

FIG. 1 is a side view of the safety seat; and

FIG. 2 is a front view thereof and,

FIG. 3 is a partial front end elevational view of the safety seat according to the present invention having an alternative guiding arrangement.

The invention is assumed to be applied to a safety seat comprising energy absorbing means of the type comprising a rod defining an enlarged portion embedded in the material of the seat.

According to this improvement, the rear part 1 and the front part 2 of the seat are separated on a joint line having the general shape of an L having a substantially vertical branch 3 and a substantially horizontal branch 4.

Disposed on the vertical branch 3 are connecting and interlocking means 5 which are associated with energy absorbing means 6 and are brought into engagement with, or disengaged from, each other by a sliding of the seat part 2 along the line 4.

The connecting means are not shown in detail since they are known per se and are not essential to an understanding of the improvement of the invention.

The horizontal branch 4 has two levels 7, 8 interconnected by a vertical or oblique portion 9 so as to ensure a lateral guiding of the seat part 2 with respect to the seat part 1.

The seat constructed in this way is secured in accordance with the arrangement disclosed in U.S. Pat. No. 3,957,303 by two straps which are maintained in hooking apertures 10 formed in the side walls of the seat part 1.

Owing to the arrangement thus described, when upon a shock the child is projected forwardly, onto the transverse portion 2a of the front seat part 2, the latter travels forwardly of the rear seat part 1 and brings into action the energy absorbing means 6. In the course of this movement, the horizontal branch 4 of the joint line ensures a good guiding of the front part 2 by preventing it from swinging downwardly. The step formed in the confronting faces of the horizontal branches 4 of the two seat parts enhances this guiding.

In this way, there is obtained a particularly simple safety seat which is very reliable in operation.

It will be understood that the cross-sectional shape of the horizontal branch 4 of the joint line has been given merely by way of example. Any other shape providing a correct guiding between the two seat parts may be employed. For example, with reference to FIG. 3 one of the confronting faces may have a groove 2c and the other a projecting bead 2b, the groove and bead having complementary sectional shapes.

Having now described my invention, what I claim as new and desire to secure by Letters Patent is:

1. A safety seat for a child for placing on a vehicle seat and comprising two separable parts, a first of said parts defining a seating having a rear end for placing adjacent a rear end of the vehicle seat and a front end and, means for fixing the safety seat to the vehicle seat, said first part further comprising on each lateral side of the safety seat a first part of two lateral side walls of the safety seat, a second of said safety seat parts comprising a transverse portion for placing in front of the child and restraining the child in the event the child is thrown forwardly of the safety seat, said second safety seat part further comprising on each lateral side of the safety seat a second part of said two side walls which is at least a front part of said side walls, energy absorbing means disposed on each side of the safety seat and associated with said two parts of the side walls, the two parts of the safety seat having a joint line of separation therebetween which has the shape of an L having a substantially vertical branch and a substantially horizontal branch, the substantially horizontal branch comprising slidable guide means between said two parts of the safety seat which have an extent which is the major part of the overall horizontal extent of the second safety seat part, locking means connected to the energy absorbing means being located in the substantially vertical branch in each side wall for interlocking the two safety seat parts.

2. A safety seat for a child for placing on a vehicle seat and comprising two separable parts, a first of said parts defining a seating having a rear end for placing adjacent a rear end of the vehicle seat and a front end, and means for fixing the safety seat to the vehicle seat said first part further comprising on each lateral side of the safety seat a first part of two lateral side walls of the safety seat, a second of said safety seat parts comprising a transverse portion for placing in front of the child and restraining the child in the event the child is thrown forwardly of the safety seat, said second safety seat part further comprising on each lateral side of the safety seat a second part of said two side walls which is at least a front part of said side walls, energy absorbing means disposed on each side of the safety seat and associated with said two parts of the side walls, the two parts of the safety seat having a joint line of separation therebetween which has the shape of an L having a substantially vertical branch and a substantially horizontal branch, the substantially horizontal branch comprising slidable guide means between said two parts of the safety seat which have an extent which is the major part of the overall horizontal extent of the second safety seat part and extend forwardly beyond a vertical plane containing said front end of the seating, locking means connected to the energy absorbing means being located in the substantially vertical branch in each side wall for interlocking the two safety seat parts.

3. The safety seat claimed in claim 1 wherein along the substantially horizontal branch the two safety seat parts have confronting faces which have a complementary shape to ensure a lateral guiding and positioning between the two safety seat parts.

4. The safety seat claimed in claim 3, wherein said confronting faces define a step in cross section of the two safety seat parts.

5. The safety seat claimed in claim 3, wherein one of said confronting faces has a groove and the other confronting face has a projecting bead of shape complementary to the shape of the groove.

* * * * *